Figure 1:
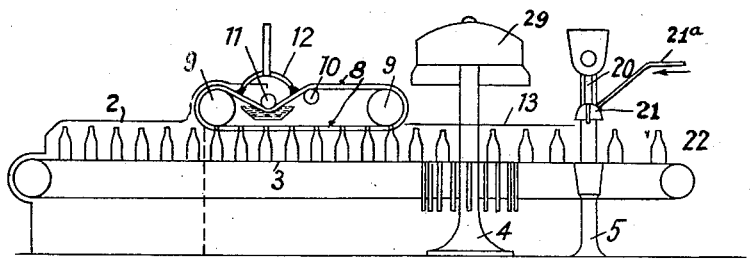

Nov. 29, 1932. A. BÖHMER ET AL 1,889,629
METHOD OF FILLING AND SEALING BOTTLES, VESSELS, AND THE LIKE
Filed Jan. 17, 1930 6 Sheets-Sheet 1

Inventors
Adam Böhmer
Georg Gebhardt
By Henry Orth atty

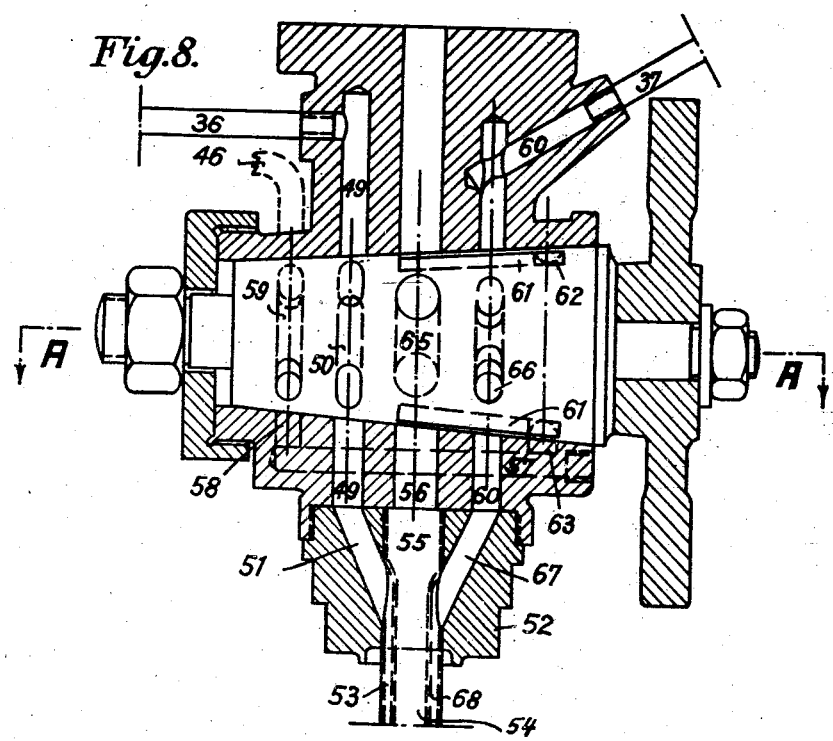
Fig. 8.
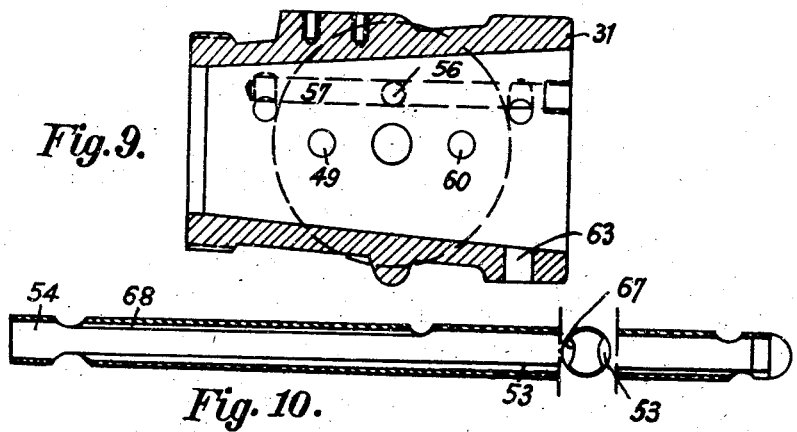
Fig. 9.
Fig. 10.

Nov. 29, 1932.　　　A. BÖHMER ET AL　　　1,889,629
METHOD OF FILLING AND SEALING BOTTLES, VESSELS, AND THE LIKE
Filed Jan. 17, 1930　　　6 Sheets-Sheet 5
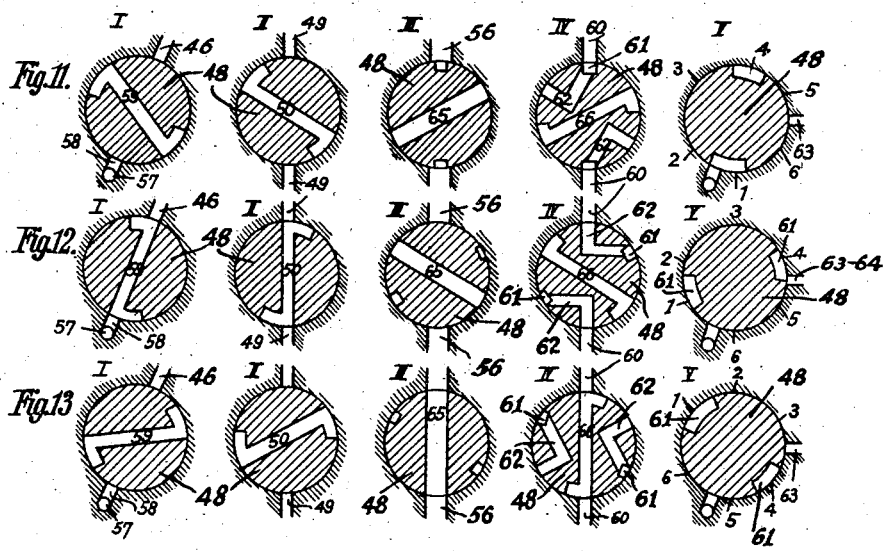
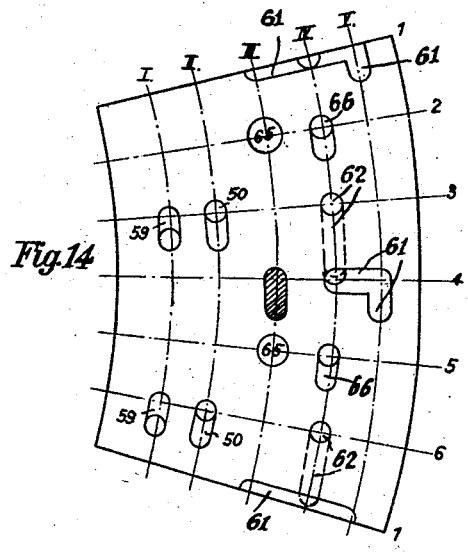

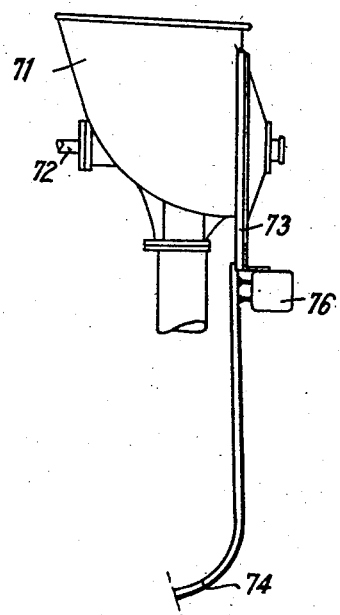
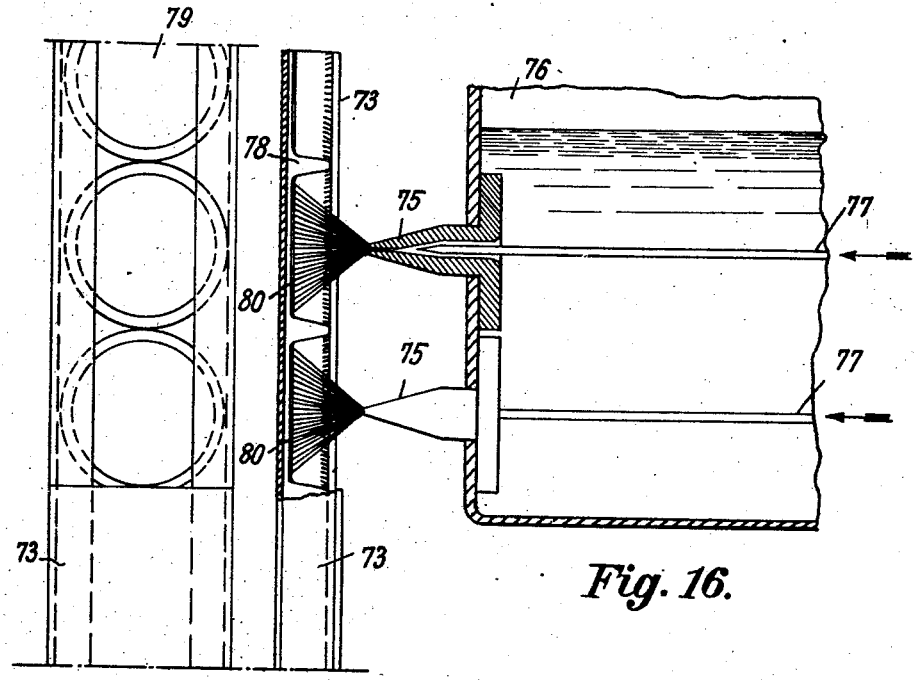

Patented Nov. 29, 1932

1,889,629

UNITED STATES PATENT OFFICE

ADAM BÖHMER AND GEORG GEBHARDT, OF BAD KREUZNACH, GERMANY, ASSIGNORS TO SEITZ-WERKE G. M. B. H., OF BAD KREUZNACH, GERMANY, A CORPORATION

METHOD OF FILLING AND SEALING BOTTLES, VESSELS, AND THE LIKE

Application filed January 17, 1930, Serial No. 421,545, and in Germany July 19, 1928.

The invention relates to a method and apparatus for filling and sealing vessels, particularly bottles, cans and similar articles such as packages and the like, so as to exclude germs, the sterilization, filling and sealing being performed in germ-free chambers.

Bottle cleaning machines are already known in which the bottles are passed through spaces of tunnel or chamber type in the course of the treatment. These machines, however, merely effect a thorough cleansing, but in no case do they bring about a sterilization followed by filling and sealing so as to exclude germs. Sealing machines are also known in which the filling and sealing of the vessels is performed in the interior of enclosed spaces, for example in the case of machines for filling canned goods. Such machines also have no appliances for sterilizing the said spaces, their sole object being to exclude the outer air or produce different conditions of pressure in the interior of the said spaces. It is true that methods and means are also known which enable filling and sealing to be performed in such a way as to exclude germs. These, however, are only adapted for manual operation and handling small quantities, but unsuitable for automatic power-operated plants such as are now generally employed in large up to date works in continuous operation. The size of the plant makes it necessary for the various apparatus for sterilizing, filling and sealing the vessels in a germ-free manner, to be set up at considerable distances apart, with correspondingly long passages through which the articles have to be conveyed from one apparatus to another. Experience has shown that, in the case of large plants, the known measure of closing the mouths of the vessels by means of flat covers, or by means of surfaces past which the mouths of the vessels are moved in sliding contact, are insufficient, since these covers themselves do not remain permanently free from germs and, moreover, they leave the parts round the mouths of the vessels unprotected. That such parts must certainly also be kept free from germs is essential because they come into contact with the filling and sealing devices, and therefore any infection present could be transmitted from one vessel to another. In order to ensure the exclusion of germs in filling bottles etc. on a large scale and by exclusively mechanical means, it has already been proposed to effect and maintain sterilization and fill and seal the vessels so as to exclude germs in the interior of a closed chamber filled with ozonized or germ-free air at a slight positive pressure in relation to the outer air and into which the vessels to be sterilized are introduced through a lock, and from which they are removed through a lock after being filled and sealed Although this method assures reliable operation on a continuous manufacturing scale, it presupposes that the mechanical appliances will operate in a perfectly automatic and smoothly running manner, so that the intervention of the attendants will rarely be needed, if at all. In the other contingency, the high ozone content of the air in the chamber might be injurious to the working staff and besides, the risk is entailed of the operatives themselves introducing germs which might find their way into the sterilized vessel or the sterilized substances to be filled therein. An apparatus adapted to be suitable for all conditions must therefore be required to be reliable in operation, whilst at the same time, all the parts must be so readily accessible that the attendants can intervene in the event of any trouble occurring. The invention fulfills these requirements completely and enables the vessels to be filled and sealed in a germ-free manner on the large scale in entirely automatic mechanical plants presenting the maximum of accessibility in the event of trouble.

The essential character of the invention consists in that the mouths and neighboring parts of the vessels or the vessels themselves from the moment they are sterilized until they are completely sealed, are moved all the time and uninterruptedly in the interior of hollow spaces which are formed of surfaces or walls of any convenient shape and extent and can be kept free from germs inside. In order to fulfill the purpose of the invention it is firstly necessary that the conveyor devices which transport the vessels from the sterilizer to underneath the filling machine and thence underneath the sealing machine, are provided with means preventing the access of germs to the mouths of the vessels and also to the devices effecting the filling and sealing of the vessels. This is effected in a simple manner, in that the device which lifts the sterilized vessels from the sterilizing apparatus to the conveyor carrying the vessels to the filling and sealing apparatus, is completely enclosed in a box-like casing which has only two openings, for the insertion and removal of the vessels, one of said openings being in communication with the sterilizing chamber. According to the invention, the vessels placed on the conveyor (belt, chain or like conveyor) are covered, before leaving said casing, with hollow covers of the lid, hood or bell type, in such a way as also to protect the parts adjoining the mouths of the vessels from contact with germs, which covers are not taken off again until the moment the vessels come into position under the filling apparatus, which also is protected from the access of germs by bell or hood-like coverings or screens. The filled vessels also are transported, with the same measures of precaution to the sealing machine, where they are provided with a germproof seal.

It is desirable that the sterilized bottles should be freed from residual traces of the gaseous sterilizing medium, such as sulphur dioxide, by scavenging them with a germ-free inert gas prior to being filled. According to the invention this is accomplished by blowing such inert gas through the bottle for some time under pressure and allowing it to escape into the air.

The remainder of the gas is then used as pressure gas, for filling the bottle with the liquid under isobarometric conditions, in the known manner. The displaced scavenging gas is preferably passed through water, in order to extract the contained sterilizing medium. The scavenging operation is performed at the stage in which the return air pipe is emptied, in known manner, of the ascending surplus of filling liquid (so-called rinsing liquid).

The filling liquid, scavenging gas and rinsing liquid are controlled by a single cock.

The crown corks serving to seal the bottles are usually sterilized in a drum and are then passed through the sorting device into a channel which feeds them in succession to the point on the sealing machine at which they are to be used. This method is attended with the risk of the corks coming into contact with the air, in the channel, and collecting external germs which afterwards find their way into the bottles sealed with such corks. This defect is obviated by the subject of the invention.

In this method, the crown corks are sterilized, as heretofore, in the storage drum and after they have passed through the sorting device and reached the channel leading to the sealing machine they are again thoroughly sterilized, preferably on their inner surface provided with the cork disc which fits on to the mouth of the bottle. With this object, the crown corks are passed, at one point of the channel, over one or more nozzles, from which a finely atomized sterilizing liquid is blown on to the inner surface of the corks. Since the metal rims of the crown corks bear against the channel, the deposition of external germs on to the cork discs subsequent to this final sterilization is prevented. In addition, the walls of the channel are also sterilized by the shallow pans of the crown corks filled with the finely atomized sterilizing medium so that all risk is precluded.

Figure 2:
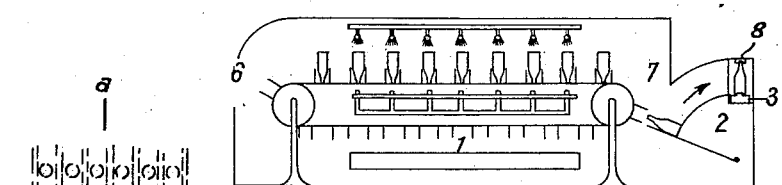
Figure 3:
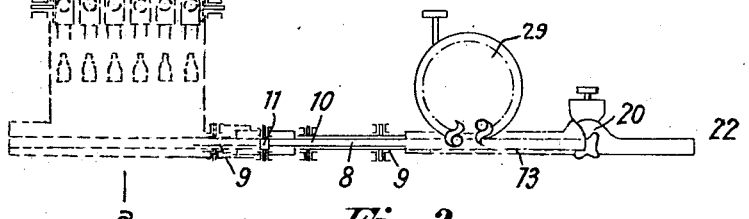
Figure 4:
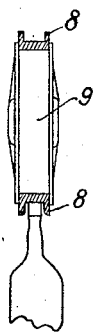
Figure 5:
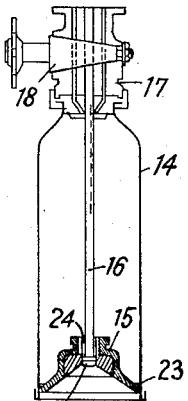
Figure 6:
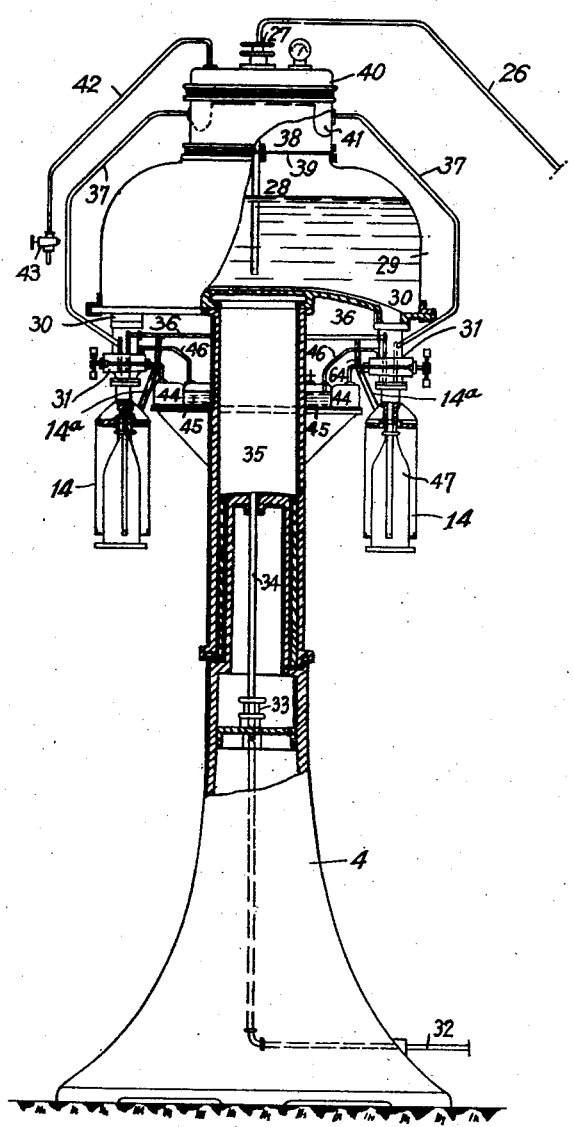
Figure 7:
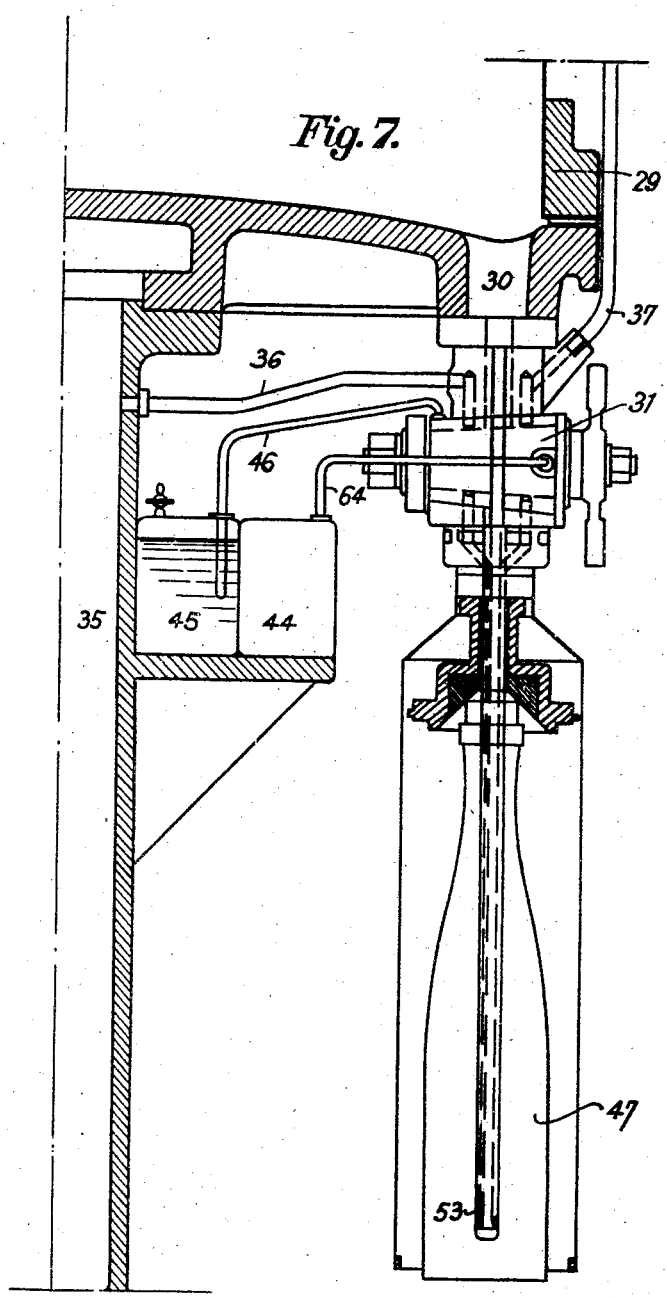

A typical embodiment of the whole apparatus is illustrated in the accompanying drawings, in which Fig. 1 is a diagrammatic view of the entire apparatus. Fig. 2 is a diagrammatic view of the sterilizing machine along the line a—a of Fig. 3, which latter is a plan of the plant. Fig. 4 is a cross-section through the covering device on a larger scale. Fig. 5 is a detail of the filling apparatus, also on a larger scale. Fig. 6 shows, on a larger scale, the filling machine itself and Fig. 7 a filling unit with the various pipe connections. Fig. 8 is a section through the cock, and Fig. 9 the cock casing, as a section along the line A—A of Fig. 8. Fig. 10 is a longitudinal sectional view through the filling tube. Figs. 11, 12 and 13 show the several sections through the five adjacently disposed bores in the spigot of the cock in three different working positions and Fig. 14 shows a plane projection of the outer surface of the cock spigot. Fig. 15 shows the apparatus for sterilizing the corks. Fig. 16 is a partial section through the corresponding atomizer and Fig. 17 is a view of the channel which guides the crown corks.

Referring in the first place to Figs. 1–5, 1 denotes the apparatus for sterilizing the bottles. The bottles are laid on a bucket chain and are intermittently rinsed out, at a number of points, with a germicide liquid and are also sprayed externally with a germicide liquid. The sterilized bottles are transferred, by a conventional form of transfer device 2 on to a conveyor belt 3 which transports them underneath the filling machine 4 and sealing machine 5. The devices 1 and 2 are completely enclosed in a box-like casing, which has only an opening at 6 for inserting the bottles and another at 7 through which they are removed. At the moment of leaving the casing the bottles standing mouth upwards on the conveyor belt are covered by a belt 8 of rubber or other elastic material and of channel cross-section. The belt is endless and travels over two pulleys 9 and one or more carrier or jockey rollers 10 and 11, the rate of travel being the same as that of the conveyor 3. The belt therefore fits with the two arms of the U hanging downwards so as to cover the mouths of the bottles and travels with the bottles until the latter come into position under the filler 4 and its covering 13. In order to keep the belt 8 free from germs, it is passed through a bath of germicide liquid and is sprayed with the same liquid through douches or nozzles. It is therefore sterilized at each revolution before being again used for covering the mouths of bottles. The filler is provided with coverings 13 which prevent germs from gaining access to the mouths of the bottles until the latter are secured in position under the filling device 16, 17 and 18. The filling tube 16 and the centering cap 15, are provided with a bell cover 14 which prevents any access of germs to the filling tube. The centering caps 15 are guided freely in the bell 14, a close fit being obtained between them by means of rubber washers 23. The bell 14 is connected to the tube 36 by means of a tube 14a which is provided with a capillary opening (Fig. 6). In this manner a sufficient quantity of a germ-free gas is passed under pressure to the upper part of the bell, and by means of this pressure preventing the entrance of germs from the air to vessel. Otherwise a vacuum would be created at the vessel and as a result the filling liquid would be agitated. Through this constant passing of sterile gas under a predetermined pressure the building up of a vacuum is prevented. The filling liquid issues from the tube 16 at a point 24 low down on one side, the lower end of the tube being closed by a cap 25, thus preventing the access of germs. By referring to Figure 10, it will be seen that the outlets 24 are enlarged, the large opening being intended for the discharge of the fluid, while the small opening services for discharging or scavenging gas from the container. The filled bottles then pass once more under the fixed covering 13 above the conveyor 3 and are transported to the sealing machine 5. The sealing devices in this machine are also provided with a screen 21 which prevents germs from dropping into the bottles. The screen is connected with a tube 21a, through which is passed a certain amount of germ-free air under pressure, thereby preventing the entering of air into the screen. The filled and sealed bottles are removed from the conveyor belt at 22.

The invention is not, however, restricted to the example illustrated but numerous modifications and other embodiments are possible. For example, the bottles might be conveyed from the sterilizer to the sealing machine through an enclosed passage into which germ-free air could be blown from the one side so that no germs could find their way into the interior of the passage. It is also possible to replace such a closed passage by channel coverings the depending sides of which engage below the mouths of the bottles. There might also be provided underneath the conveyor, a trough, filled, for example, with a germicide liquid in which the mouths of the vessels are slightly submerged. Another possibility consists in covering the sterilized bottles with capsules, bell covers or caps, which are taken off when the bottles have reached the filling machine. These caps might be connected and movable with the conveyor chain itself by being hinged on small pillars or slidably disposed in the vertical direction. At each revolution the caps can be sterilized by rinsing them out with a germicide solution before being applied to fresh vessels. It is also possible to make the covering capsules of cheap material, such as crepe paper, these being then sterilized in any known manner and slipped over the mouths of the vessels and, afterwards on reaching the filling machine, being removed by any convenient means such as suction, blowing or the like. The filler may also be of different design by surrounding all the fillers with a single bell below the bottom plate of the container in place of the numerous separate bells.

The filling machine according to Figs. 6-14 is constructed in the following manner:

The sterile filling liquid is admitted into the stock vessel 29 by way of the pipe 26, stuffing box 27 and pipe 28. The vessel 29 is provided with a plurality of outlet branches 30 leading to the filling units 31.

The inert gas, such as carbon dioxide, for scavenging the gaseous medium present in the bottle is passed through the pipe 32, stuffing box 33 and pipe 34 to a pressure vessel 35 connected to the filling units 31 by the pipes 36. The return air is passed through the pipes 37 connecting the filling units 31 with the space 38 above the filling vessel 29. Between this space 38 and the vessel 29 is a filtering layer 39 which prevents germs from entering the filling liquid by way of the return air pipe 37.

In addition, the space 38 communicates with the outer air by way of the pipe 42 and cock 43, a filtering layer 40 being, however, provided in order to prevent germs being carried into the apparatus by the air entering from the outside.

The return air pipe 37 does not open directly into the space 38 but into an annular receptacle 41, which is disposed inside 38, is open at the top and is adapted to catch any traces of liquid entering from the pipe 37. By means of a pressure-balancing and liquid discharging pipe (not shown), this receptacle 41 is connected with a collecting channel 44 which is shut off from the outer air and serves at the same time to collect the rinsing or drip liquid from the pipe 37. There is also a second receptacle 45 which is connected with the discharge pipe 46 and is partially filled with water. The discharge pipe 46 forms a conductor through which blow off gases from the bottles passes into the water receptacle 45. The mouth of the pipe 46 dips below the level of the liquid in 45. Consequently, the gaseous medium expelled from the bottle by the inert gas cannot escape into the outer air until it has passed through the water in 45 and thus been freed from any soluble matters present.

The spigot of the filling cock, is represented in Figs. 8, 9 and 11–14, and is provided with five bores adjacently disposed on planes at right angles to the axis of the cock and connected to the various conduits. The one connected with the bore 65 serves to admit the filling liquid into the bottle 47, while the adjacent bore 50 on the one side admits the scavenging gas into the bottle and the adjacent bore 66 on the other side connects the bottle with the return air pipe 37. When in the operative position the bore 59 connects the bottle with the receptacle 45 in order to allow the gas in the bottle to escape to the outside. The fifth bore 62 serves to convey the rinsing or drip liquid from the pipe 37 into the receptacle 44.

The apparatus operates in the following manner: The vessel, such as a bottle 47, to be filled is pressed in an air-tight manner by any known means against the filling unit 31, the cock being at first set with its several bores in the position shown in Fig. 11, all the openings being therefore closed. Said cock may be manually or otherwise rotated during the operation. When the bottle is fixed in position, the cock is turned into the position shown in Fig. 12 so that, in the first place, the pressure vessel 35 is placed in communication with the passage 51 of the mount 52 of the filling tube, by way of the pipes 36 and 37 and the bore 50 of the spigot 48, so that the inert germ-free gas from the vessel 35 can enter the bottle by way of the pipe 36 and the second bore of the cock. The gas flows through the outer passage 53 of the filling tube 54 (Fig. 10) and enters the bottle at the lower end. The gas expels the gaseous medium in the bottle in the upward direction into the bore 55 and then through the bores 56, 57 and 58 in the cock casing into the bore 59 of the spigot, from which it passes through 46 into the receptacle 45, where the injurious vapours are absorbed leaving the remainder of the gas to escape into the outer air.

In this second position of the spigot 48 the return air pipe 37 is at the same time placed in communication—through the bores 60 and 63 of the casing, the angular bore 62 and transverse passage 61 of the spigot—with the pipe 64 (Fig. 7), which leads to the receptacle 44 and is connected with the bore 63 of the cock casing. Consequently the return air pipe 37 also is freed from liquid and is able to convey the return air to the vessel 29 during the immediately subsequent filling of the bottle.

The filling is effected by turning the cock into the third position (Fig. 13). The central bore 65 then admits the liquid from the vessel 29 directly into the filling tube 54 and thus into the bottle 47. The return air from the bottle flows through the passage 68 of the filling tube, the passage 67, the bore 66 of the spigot and passage 60 into the return air pipe 37 from which it passes into the filtering chamber 38 between the filtering layers 39 and 40. The surplus air (inert gas) from the bottle forces its way through the filtering layer 40 and escapes to the outside through the pipe 42 and cock 43. When the bottle is full the cock is turned into the first position (Fig. 11) again, and the bottle can be removed and replaced by another.

The apparatus can be equipped with any convenient number of filling units and the bottles may be fed into and removed from the machine automatically, if desired, and the control of the cock can be combined with the insertion and removal of the bottles.

Figs. 15–17 show the apparatus for sterilizing the corks, especially the so-called crown corks.

The crown corks are placed in the hopper 71 in known manner and stirred around with a pre-sterilizing liquid by means of a drum rotated by the shaft 72. They then descend, in known manner, through a sorting device into the chute 73 which feeds them at 74 to the operative position in the sealing machine.

At one point, preferably in the vicinity of the hopper 71, a number of nozzles 75 are provided which are connected to a vessel 76 containing a sterilizing liquid. The orifice of the nozzles may be adapted to be controlled by the needle valves 77. The chute 73 containing the crown corks 78 is provided at the point opposite the nozzles with a broad slot 79 so that the liquid sprayed by the nozzles 75 is distributed over the crown corks, the cork discs of which face the nozzles. In this way each cork is again sterilized with the finely distributed sterilizing liquid, especially on its inner surface and remains sterilized until finally secured on the bottle. Since, during their further progress through the chute, their rims remain in contact with the walls of the latter, the interior space of each crown cork containing the cork disc 80 remains filled with the sterilizing vapours, thereby assuring complete freedom from germs until the bottle has been sealed.

The means controlling the injecting nozzles may also be different from that shown and the successive nozzles may be of any desired number.

If desired a further device may be provided by means of which the discharge of liquid from the nozzles may be controlled in accordance with the intermittent forward movement of the crown corks in the chute, the nozzles being closed so long as the corks are in motion and opened when they come to rest. An automatic device may also be provided for shutting off the nozzles when the entire machine is at a standstill.

We claim:

1. A method for the germ-free filling and sealing of bottles, vessels and the like in a continuous manner by means of a sterilizing medium and in the absence of heat which comprises cleaning and sterilizing the vessels, passing them in an endless row to be filled, blowing the residual sterilizing medium from the vessels, filling said vessels, sealing the vessels with sterilized sealing means and maintaining the vessels free from germs, from the time they are cleaned until they are sealed.

2. A method for the germ-free filling and sealing of bottles, vessels and the like as defined by claim 1, in which the vessels are maintained free from germs by passing them through a germ-free zone, then covering the openings while passing to be filled.

3. A method for the germ-free filling and sealing of bottles, vessels and the like as defined by claim 1 in which the vessels are maintained free from germs by passing them through a germ-free enclosure, then covering the openings thereof with a freshly sterilized covering while passing to be filled.

4. A method for the germ-free filling and sealing of bottles, vessels and the like as defined by claim 1, in which the residual sterilizing medium is blown out of the bottles by means of a non-reactant gas and maintaining a pressure on the filling material with the residual non-reactant gas.

5. A method for the germ-free filling and sealing of bottles, vessels and the like as defined by claim 1, in which the sealing means are sprayed with a sterilizing fluid, before sealing of the vessels.

6. In a device for sterilizing, filling and sealing bottles, vessels and the like, means for conveying said vessels in an endless row, means for maintaining said vessels free from germs in the absence of heat, a means for filling said vessels, said filling means being surrounded by a covering means and means for passing a germ-free gas to said covering means.

7. In a device for sterilizing, filling and sealing bottles, vessels and the like, means for filling said bottles and means for sealing the same, means for conveying said vessels in an endless row to a filling means and then to a sealing means, inverted U-shaped covering means moving with said vessels above the said conveying means forming germ-free chambers and through which the mouths of the vessels are adapted to pass.

8. In a device for sterilizing, filling and sealing bottles, vessels and the like, as defined by claim 7 in which the sealing means is provided with a covering means for covering the mouths of the vessels and means for passing a germ-free gas into said covering means.

9. In a device for sterilizing, filling and sealing bottles, vessels and the like, as defined by claim 7 in which a tube for cleaning gas is connected to the filling means, a return gas tube from the filling means, said return gas tube passing to a chamber having a filter on one side connecting it to the filling supply and a filter on the other side connecting it to the atmosphere.

10. In a device for sterilizing, filling and sealing bottles, vessels and the like, as defined by claim 7 in which the filling means is provided with a filling cock having a bore for the liquid, a bore for admitting the cleaning gas, a bore for the escape of the displaced gases, a bore for balancing the return gases, and a bore for the removal of the rinsing liquid.

11. In a device for sterilizing, filling, and sealing bottles, vessels and the like, as defined by claim 7 in which the sealing means is provided with a feeding chute for the sealing caps and a means adjacent said feeding chute for spraying said caps with a sterilizing fluid.

12. In a device for sterilizing, filling and sealing bottles, vessels and the like the combination of an enclosed sterilizing chamber with an enclosed germ-free chamber, an endless conveying means in said germ-free chamber and oscillatable means pivoted between said chambers for lifting said vessels from the first chamber to the conveyor of the second chamber, a flexible means adjacent the second chamber cooperating with the said endless conveyor to close the openings of said vessels.

13. In a device for sterilizing, filling and sealing bottles, vessels and the like the combination of an enclosed sterilizing chamber with an enclosed germ-free chamber, an endless conveying means in said germ-free chamber and oscillatable means pivoted between said chambers for lifting said vessels from the first chamber to the conveyor of the second chamber, a flexible means adjacent the second chamber cooperating with the endless conveyor to close the openings of said vessels, a sterilizing receptacle and means for passing said flexible means through said sterilizing receptacle.

In testimony that we claim the foregoing as our invention, we have signed our names.

ADAM BÖHMER.
GEORG GEBHARDT.